United States Patent [19]

Muraishi et al.

[11] Patent Number: 5,067,702
[45] Date of Patent: Nov. 26, 1991

[54] DISPENSER FOR DISPENSING SHEETS OF AN ALTERNATING FIRST AND SECOND KIND FROM A STACK

[75] Inventors: Katsuaki Muraishi; Masahiro Onishi; Nobufumi Mori, all of Kanagawa; Hiromi Nunome; Tetsuo Oikawa, both of Tokyo, all of Japan

[73] Assignees: Jeol Ltd., Tokyo; Fuji Photo Film Co., Ltd., Kanagawa, both of Japan

[21] Appl. No.: 529,219

[22] Filed: May 25, 1990

[30] Foreign Application Priority Data

May 29, 1989 [JP] Japan .................................. 1-136480

[51] Int. Cl.5 .............................................. B65H 3/50
[52] U.S. Cl. .................................... 271/134; 271/137;
271/166; 414/798; 221/292
[58] Field of Search .................... 271/18, 42, 131, 133,
271/134, 136, 165, 166, 137, 138, 167; 221/289,
292, 293; 414/798, 798.1

[56] References Cited

U.S. PATENT DOCUMENTS 3,251,593  5/1966  Reid et al. ...................... 271/134 X
3,565,421  2/1971  Webster ............................. 271/18
3,790,160  2/1974  Schmidt ......................... 271/18 R

FOREIGN PATENT DOCUMENTS 0271097  8/1989  Fed. Rep. of Germany ... 414/798.1
631421  11/1978  U.S.S.R. ............................ 271/134
2000108  1/1979  United Kingdom ............... 271/131

Primary Examiner—H. Grant Skaggs
Assistant Examiner—Boris Milef
Attorney, Agent, or Firm—Webb, Burden, Ziesenheim & Webb

[57] ABSTRACT

An apparatus for successively removing stacked sheets, such as stimulable phosphor sheets used in electron microscopy, from a housing. The stack consists of alternate layers of a first kind and a second kind of sheets. Each sheet of the first kind has a first notch in a first position. Each sheet of the second kind has a second notch in a second position. One edge of the lowermost sheet of the stack is supported on a projection which can be moved along the edge. Thus, the stack is inclined in the housing. The projection is movable from its home position, first and second stop positions aligned with the notches. When the projection is moved to a position registering with the notch on the lowermost sheet, that sheet only is dropped to a position from which it is ejected from the apparatus.

6 Claims, 3 Drawing Sheets

DISPENSER FOR DISPENSING SHEETS OF AN ALTERNATING FIRST AND SECOND KIND FROM A STACK

FIELD OF THE INVENTION

The present invention relates to an apparatus for dispensing sheets and, more particularly, to an apparatus that successively dispenses sheets from a stack, such as made from a recording material used in electron microscopy, to a display device or the like.

BACKGROUND OF THE INVENTION

It is known to use a stimulable phosphor sheet to record and visualize an electron optical image obtained in an electron microscope. In particular, such an electron optical image is recorded on the phosphor sheet. Then, the sheet is exposed to stimulating rays such as visible light. This gives rise to generated light emission, which is detected and converted into an electrical signal to make the electron optical image visible.

In order to take sheets of a recording material such as storage-type phosphor sheets out of a housing in an electron microscope and to move them into a position where photographs are taken, a dispenser apparatus shown in FIG. 1 has been heretofore used.

In FIG. 1, sheets 21 of a recording material for use in an electron microscope as described above are stacked on top of each other within a housing 22. The dispenser apparatus comprises a dispenser means 23 for withdrawing and conveying the sheets. The electron microscope includes a microscopic column 24, an observation chamber 25, a fluorescent screen 26, and a camera chamber 27. The sheets on which electron optical images have been recorded are received in a casing 28. The dispenser means 23 has claws 29 (only one is shown). The claws 29 are brought into engagement with the lowermost sheet inside the housing 22, and then the sheet is taken out of the housing. Subsequently, the sheet is sent to a position where a photograph is taken inside the camera chamber 27. An electron optical image is projected onto the sheet 21' placed at this position for photography while using the fluorescent screen 26 as a shutter, i.e., opening and closing it, to photograph the image. Thereafter, the dispenser means 23 carries this sheet 21' into the casing 28, where the sheet is stored.

In the apparatus constructed as described above, the lowermost sheet inside the housing 22 is taken out of it by movement of the claws 29 of the dispenser means 23. This mechanism presents the following problems.

Where the claws 29 are brought into engagement with one edge of the sheet and the sheet is pushed out of the housing, the distance between the front end of each claw 29 and the bottom of the housing 22 must be set less than the thickness of each sheet; otherwise it would be impossible to take out only the lowest sheet. Therefore, it is necessary to set the length of the claws above the base less than the thickness of the used sheets of a recording material. In this case, if the edge portions of the sheets which are to be engaged by the claws warp upwardly, then the claws will fail to engage the edges of the sheets, thus swinging idly. As a result, the sheets may not be moved into the camera chamber.

Where quite thin sheets of a recording material are employed, it is difficult to accurately maintain the distance between the bottom surface of the housing and the front end of each claw. Thus, the claws may swing idly as mentioned above. In addition, the claws may disengage from the edges of the sheets while they are being conveyed, so that the claws swing idly. Two sheets may be transported simultaneously as a stack. In any case, successive conveyance is impeded.

SUMMARY OF THE INVENTION

It is an object of the present invention to provide an apparatus capable of taking a stack of plural sheets as made from a recording material out of a housing, one at a time, with certainty.

It is another object of the invention to provide a compact apparatus which acts to convey sheets and is simple in structure.

It is a further object of the invention to provide an apparatus which is simple in structure, acts to convey sheets, and is capable of maintaining the sheets stacked on top of each other with certainty except for the sheet about to be taken out.

It is yet another object of the invention to provide an apparatus which acts to convey sheets by electrical control and prevents the sheets from dropping to their takeout position.

In accordance with the invention, the sheets can be certainly separated from each other and caused to fall to their takeout position one by one. Therefore, if the sheets are thin, or if their edge portions warp upward, they can be successively taken out of a housing with certainty.

In one feature of the invention, the stack of the sheets is inclined. Only one projection is moved to separate one sheet from the stack and to allow the sheet to drop. Since the apparatus is designed in this way, the apparatus is compact and simple in structure.

In another feature of the invention, the projection can assume any one of a first stop position, a second stop position, and a home position located between them. The stack is supported while the projection is retained in its home position. Hence, the stack can be held with certainty, and the action can be performed certainly, although the structure is simple.

In a further feature of the invention, the position of a slider which separates one sheet from the stack is monitored by the use of the output signals from position detectors and controlled by a control unit. This is adapted for automation of the apparatus.

Briefly, according to this invention, there is provided an apparatus for dispensing sheets from a stack of sheets. A housing holds the stack of sheets consisting of first and second kinds of sheets alternately placed in the stack. The first and second kinds of sheets have notches along one edge but at different positions. A projection extending into the housing supports the lowermost edge of the stack so that the stack is held at an angle with one edge of the lowermost sheet resting on the floor of the housing and the opposite edge raised above the floor. The projection is mounted to be movable along the lowermost edge which it supports. Apparatus is provided to move the projection between a first stop position at which it registers with the notches in the first kind of sheets and a second position at which it registers with the notches in the second kind of sheets. A drive is provided to move the projection between the first and second positions to permit the lowermost sheet in the stack to fall one at a time to the floor of the housing where a mechanism is provided to push the sheet on the floor out of the housing.

Other and further objects of the invention will become obvious upon an understanding of the illustrative embodiment about to be described or will be indicated in the appended claims, and various advantages not referred to herein will occur to one skilled in the art upon employment of the invention in practice.

DETAILED DESCRIPTION OF THE PREFERRED EMBODIMENT

Figure 1:
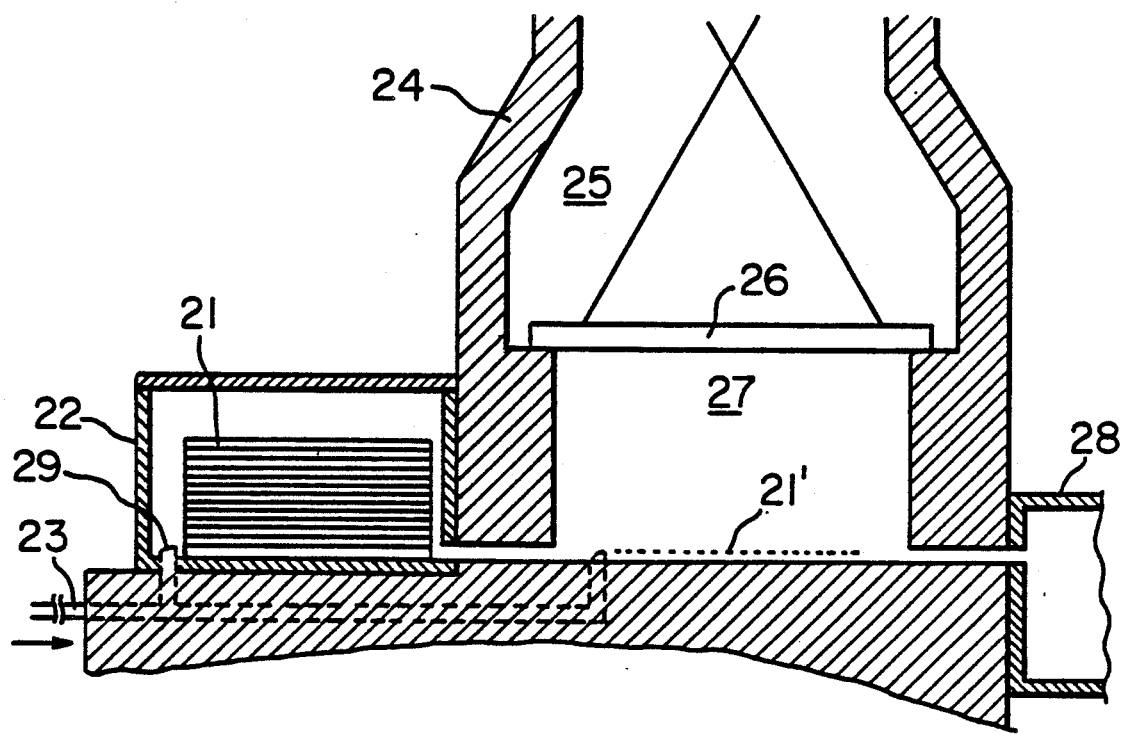
FIG. 1 is a cross-sectional view of the prior art dispenser apparatus.
Figure 2:
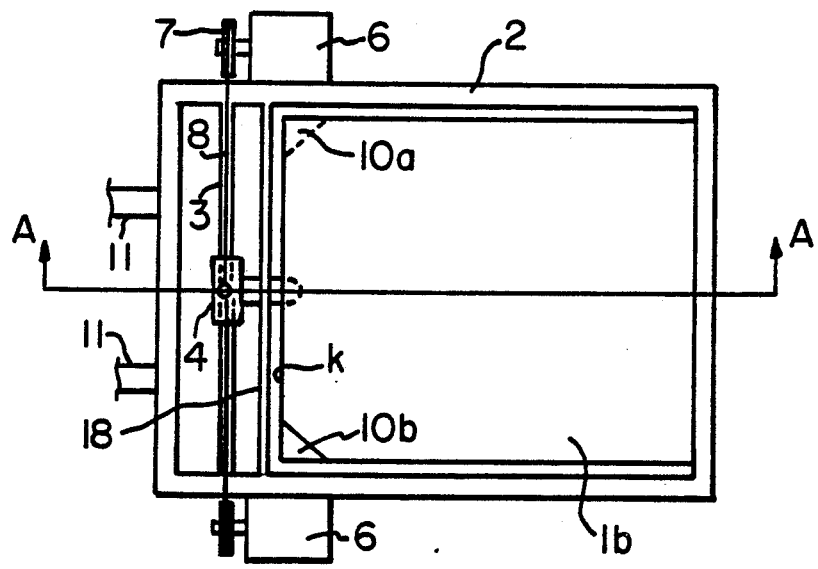
FIG. 2 is a side elevation of a dispenser apparatus according to the invention.
Figure 3:
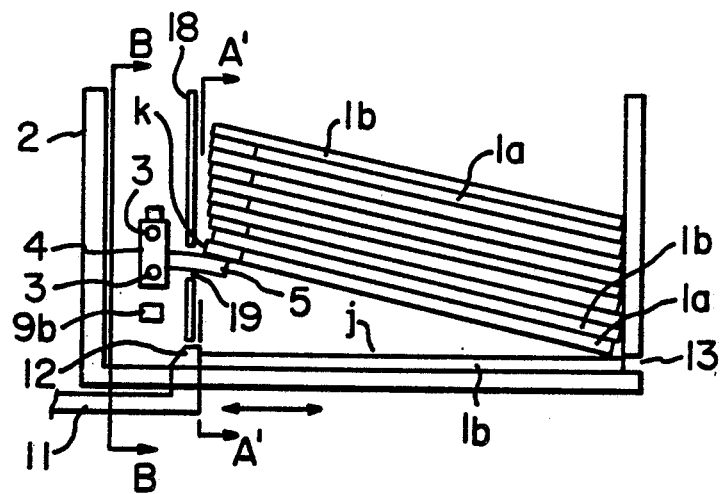
FIG. 3 is a view taken along line A—A of FIG. 2.
Figure 4:
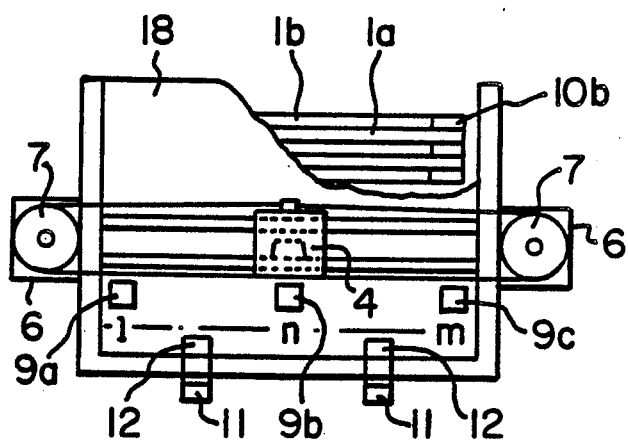
FIG. 4 is a view taken along line B—B of FIG. 3.
Figure 5:
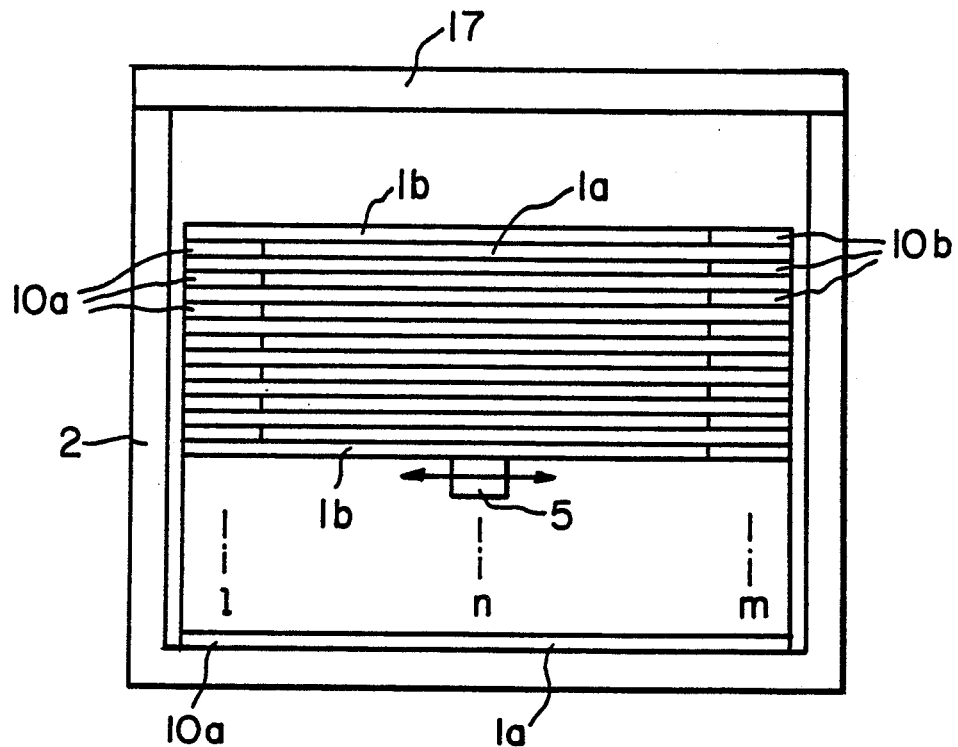
FIG. 5 is a view taken along line A'—A' of FIG. 3, for illustrating the operation.

Referring to FIGS. 2 through 5, there is shown a dispenser apparatus according to this invention. The dispenser comprises a box-like housing 2 in which the phosphor sheets are stacked at an angle to the floor of the dispenser. The phosphor sheets are of two kinds 1$a$ and 1$b$ which are alternately positioned in the stack. The phosphor sheets differ by having notches 10$a$ and 10$b$ at spaced apart positions along one edge. The raised end of the stack is supported above the floor of the housing by a projection 5 extending through one wall of the housing serving as a guide plate 18 to align the edges of the stack supported by the projection 5. The projection 5 is mounted for slidable movement side to side along the edge of the phosphor sheet aligned by the guide plate 18. Hence, the projection 5 can be brought into registry with the notches 10$a$ and 10$b$. The projection is supported by a slider 4 which is carried by guide rails 3. The slider may be urged in either direction by the action of electric motors 6 connected to the slider by a wire 8 and pulleys 7 connected to the motors. Position detectors 9$a$, 9$b$, and 9$c$ detect the alignment of the slider at spaced positions along the guide rails. An exit port 13 is provided along the floor of the housing on the side opposite of the guide plate 18. The height of the exit port 13 is set such that one sheet can pass through it at a time. Shafts 11 with upwardly extending protrusions 12 reciprocate parallel to the floor of the housing to eject a phosphor sheet lying upon the floor out of the exit port 13.

The stacked sheets are automatically aligned with each other by the guide plate 18 as they are received in the housing 2. The projection 5 is mounted in the housing 2 to support one edge k of the lowermost sheet, for preventing the sheet from dropping into a takeout position j where the sheet is taken out. The projection 5 is mounted to the slider 4 which can move along the guide rails 3. The guide plate 18 is provided with a slot 19 through which the projection 5 extends. The slider 4 is connected to the wire 8 which is driven by the motors 6. The projection 5 can be moved along the edge k by operating the motors 6. The projection 5 can be stopped at any one of the first stop position 1, a second stop position m, and a home position n located between the two stop positions 1 and m.

Figure 6:
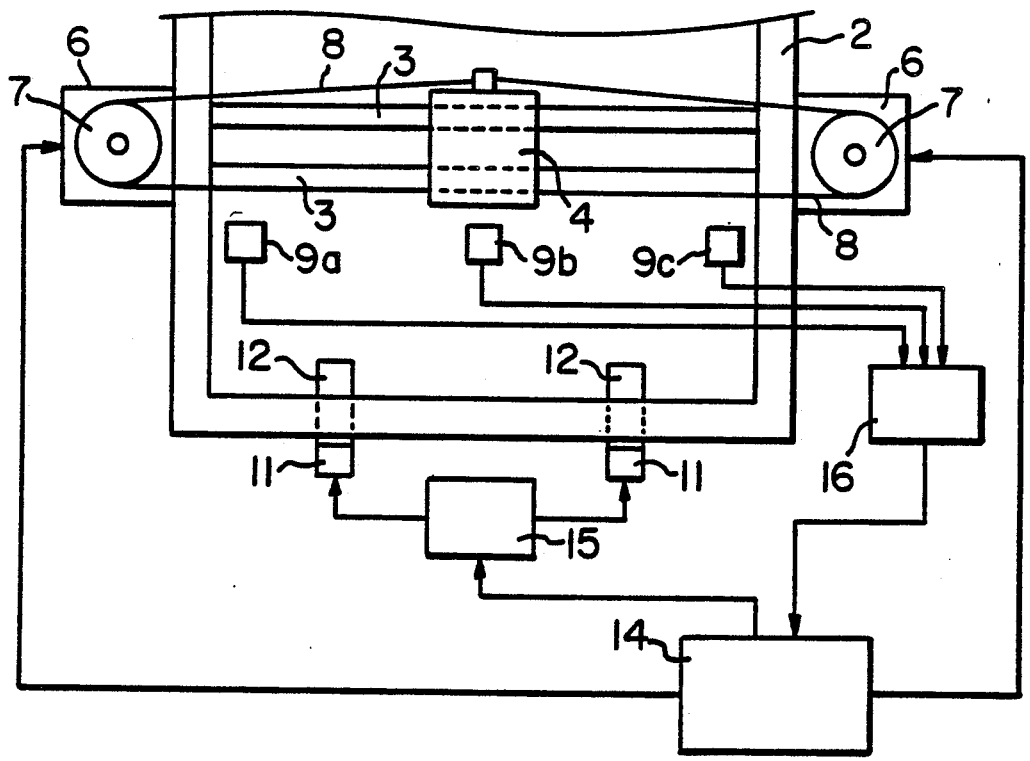
FIG. 6 is a block diagram of a mechanism for driving the dispenser apparatus shown in FIGS. 2-5.

FIG. 6 shows the mechanism for controlling the movement of the slider 4. This mechanism comprises a driving mechanism 15 and a control unit 14 that controls the mechanism 15 and the rotation of the motors 6. The mechanism 15 drives the shafts 11 for taking out a sheet. The position detectors 9$a$, 9$b$, 9$c$ are each provided with an optical sensor. When the slider 4 is in front of any one of the position detectors, the detector produces an output signal to a position-detecting unit 16. The detecting unit 16 sends a signal indicating the position of the slider to the control unit 14 in response to the signal applied to the unit 16. The control unit 14 controls the rotation of the motors 6 according to the output signal from the position-detecting unit 16 to control the movement of the projection 5 along the edge k.

Referring back to FIGS. 2-5, the sheets 1$a$ and 1$b$ are stacked alternately on top of each other inside the housing 2. Each sheet 1$a$ has the notch 10$a$ in the first stop position 1, while each sheet 1$b$ has the notch 10$b$ in the second stop position n. The notches 10$a$ and 10$b$ are made larger in size than the projection 5 to permit the sheets to be released from the projection 5. Normally, the projection 5 is located in the central, home position n. The stack of the sheets is supported on the projection 5. After the sheets have been set in the housing 2, a cover 17 (FIG. 5) is placed on the housing 2.

In the apparatus constructed as described thus far, the sheets stacked on top of each other in the housing are taken out one by one in the manner described now. The projection 5 is moved from its home position n to the first stop position 1 by the aforementioned driving mechanism. When the projection arrives at the first stop position 1, the arrival is detected by the detector 9$a$ and the position-detecting unit 16. Then, the slider 4 is retained in the first stop position 1 under the instruction of the control unit 14. The projection 5 enters the notch 10$a$ in the lowermost sheet 1$a$, so that this sheet is released from the projection 5. The sheet separated from the stack drops to the takeout position j. Under this condition, the next sheet 1$b$ is located at the lowermost position. Since this sheet 1$b$ has no notch in the first stop position 1, the stack including the new lowermost sheet 1$b$ is supported on the projection 5. After the above-described sheet 1$a$ is caused to drop by the projection 5, it is immediately moved by the driving mechanism into the home position n, where it is at rest.

The sheet reaching the takeout position j is taken out of the housing 2 through the exit port 13 by means of the protrusions 12 mounted to the takeout shafts 11. Then, the sheet is conveyed into the position at which an electron micrograph is taken.

The second sheet is withdrawn from the housing 2 in the manner described now. The projection 5 is moved from the home position n to the second stop position m by the driving mechanism. Since the lowermost sheet 1$b$ has the notch 10$b$ in the second stop position m, only the lowest sheet 1$b$ disengages from the projection 5 and falls to the takeout position j. Then, the sheet is taken out of the housing 2 and moved into the photography position, in the same way as in the foregoing process. After this sheet 1$b$ drops, the next sheet 1$a$ and the upper sheets are supported by the projection 5.

As described above, the projection 5 is shifted into the first and second stop position alternately after placed in the home position. Thus, the stacked sheets are successively caused to drop to the takeout position j, whence they are taken out of the housing 2 one after another.

Since the sheets stacked in the housing 2 are supported on the projection 5, a gap is created between the lowermost sheet and the takeout position j. This gap enables only the lowermost sheet to separate from the upper sheets and drop. Therefore, the length or extension above the floor of the housing of the takeout protrusions 12 mounted to the takeout shafts 11 can be made much larger than the thickness of the sheets. Consequently, if edge portions warp upwardly as frequently encountered where sheets are thin, the takeout protrusions 12 engage the lowermost sheet with certainty. This assures that the sheets are taken out and conveyed successively.

While a preferred embodiment has been described, such description is for illustrative purposes only, and it is to be understood that changes and variations may be made without departing from the spirit or scope of the appended claims. In the above example, the sheets made from a recording material have notches at their edges, especially corners. The notches may be formed at other locations in the sheets. Also, in the above example, the dispenser apparatus is designed to successively take out and convey sheets of a recording material such as storage-type phosphor sheets. The apparatus can also successively take out other objects resembling sheets and forming a stack. Also, in the above example, the invention is applied to the apparatus for carrying sheets of a recording material into the photography position in an electron microscope. The invention is also applicable to an apparatus for conveying storage-type phosphor sheets on which electron optical images have been recorded into a reading device.

Having thus described our invention with the detail and particularity required by the Patent Laws, what is claimed and desired to be protected by Letters Patent is set forth in the following claims.

1. An apparatus for conveying sheets from a stack of sheets, comprising:
   a housing accommodating a stack consisting of alternate sheets of first and second kinds stacked on top of each other, each sheet of the first kind having a first notch in a first position, each sheet of the second kind having a second notch in a second position;
   a projection that supports one edge of the lowermost sheet of the stack to prevent the stack from falling to a takeout position at which the sheets of the stack are taken out, the projection being so mounted as to be movable along said edge;
   a guide plate which is mounted in the housing and guides and aligns the edges of the sheets of the stack located upon the same side as the edge of the lowermost sheet which is supported upon the projection;
   the guide plate defining a slot and through which slot the projection extends to support the edge of the lowermost sheet;
   a driving means for moving the projection into a first stop position corresponding to the first notch and a second stop position corresponding to the second notch alternately, to permit only the lowermost one of the sheets of the stack to fall at a time; and
   a means for taking the sheet placed in the takeout position out of the housing.

2. An apparatus for conveying sheets as set forth in claim 1, wherein the edge of the lowermost sheet which is opposite to the edge supported upon the projection is placed at the bottom of the housing, whereby the stack is inclined inside the housing.

3. An apparatus for conveying sheets as set forth in claim 1, further comprising a control means which causes the driving means to place the projection in a home position located midway between the two stop positions, for holding the stack.

4. An apparatus for conveying sheets as set forth in claim 1, wherein each sheet is a stronger-type phosphor sheet.

5. An apparatus for conveying sheets from a stack of sheets, comprising:
   a housing accommodating a stack consisting of alternate sheets of first and second kinds stacked on top of each other, each sheet of the first kind having a first notch in a first position, each sheet of the second kind having a second notch in a second position;
   a projection that supports one edge of the lowermost sheet of the stack to prevent the stack from falling to a takeout position at which the sheets of the stack are taken out, the projection being so mounted as to be movable along said edge;
   a guide plate which is mounted in the housing and guides and aligns the edges of the sheets of the stack located upon the same side as the edge of the lowermost sheet which is supported upon the projection;
   the guide plate defining a slot and through which slot the projection extends to support the edge of the lowermost sheet;
   a guide rail mounted upon the opposite side of the guide plate from the stack;
   a slider which is movable along the guide rail and to which the projection is mounted;
   a driving means for moving the projection into a first stop position corresponding to the first notch and a second stop position corresponding to the second notch alternately, to permit only the lowermost one of the sheets of the stack to fall at a time; and
   a means for taking the sheet placed in the takeout position out of the housing.

6. An apparatus for conveying sheets from a stack of sheets, comprising:
   a housing accommodating a stack consisting of alternate sheets of first and second kinds stacked on top of each other, each sheet of the first kind having a first notch in a first position, each sheet of the second kind having a second notch in a second position;
   a projection that supports one edge of the lowermost sheet of the stack to prevent the stack from falling to a takeout position at which the sheets of the stack are taken out, the projection being so mounted as to be movable along said edge;
   a driving means for moving the projection into a first stop position corresponding to the first notch and a second stop position corresponding to the second notch alternately, to permit only the lowermost one of the sheets of the stack to fall at a time;
   a means for taking the sheet placed in the takeout position out of the housing;
   a control means which causes the driving means to place the projecting in a home position located midway between the two stop positions, for holding the stack;
   detectors disposed corresponding to the first stop position, the second stop position, the home position, respectively, to sense that the projection is located in these positions, respectively; and
   a control unit which controls the driving means according to the output signals from the detectors in such a way that the projection is moved into the first and second positions alternately from the home position, for causing the sheets of the stack to drop successively.

* * * * *

UNITED STATES PATENT AND TRADEMARK OFFICE
CERTIFICATE OF CORRECTION

PATENT NO. : 5,067,702

DATED : November 26, 1991

INVENTOR(S) : Katsuaki Muraishi, Masahiro Onishi, Nobufumi Mori, Hiromi Nunome and Tetsuo Oikawa It is certified that error appears in the above-identified patent and that said Letters Patent is hereby corrected as shown below:

Column 4 Line 18 "n" should read --m--.

Claim 4 Line 4 Column 6 "stronger" should read --storage--.

Claim 6 Line 56 Column 6 "projecting" should read --projection--.

Signed and Sealed this

Eighth Day of June, 1993

Attest:

MICHAEL K. KIRK

Attesting Officer

Acting Commissioner of Patents and Trademarks